United States Patent [19]

Lalikos et al.

[11] Patent Number: 4,854,416
[45] Date of Patent: Aug. 8, 1989

[54] TUNED SELF-DAMPING CONVOLUTED CONDUIT

[75] Inventors: James M. Lalikos, Springfield; Harold K. Waite, East Longmeadow, both of Mass.

[73] Assignee: Titeflex Corporation, Springfield, Mass.

[21] Appl. No.: 884,312

[22] Filed: Jul. 11, 1986

Related U.S. Application Data

[63] Continuation-in-part of Ser. No. 873,836, Jun. 9, 1986, which is a continuation-in-part of Ser. No. 828,279, Feb. 11, 1986.

[51] Int. Cl.$^4$ ............................................. F16F 15/00
[52] U.S. Cl. ..................................... 181/207; 181/227; 138/131; 138/132; 138/133; 138/137; 138/138; 138/139; 60/322
[58] Field of Search ........................... 181/207–209, 181/227; 138/121, 124, 147, 173, 122, 123, 144, 131–133, 137–139; 60/322

[56] References Cited

U.S. PATENT DOCUMENTS

| | | | |
|---|---|---|---|
| 72,488 | 12/1867 | Hartley | 138/131 X |
| 507,145 | 10/1893 | Macan | 138/147 |
| 650,290 | 5/1900 | Wirt | 181/207 |
| 1,343,236 | 6/1920 | Stukenburg | 138/124 |
| 2,913,011 | 11/1959 | Noyes et al. | 138/122 X |
| 2,941,911 | 6/1960 | Kummick et al. | 181/207 |
| 3,217,832 | 11/1965 | Whitney | 181/208 |
| 3,369,426 | 2/1968 | Matz, Jr. | 138/129 X |
| 3,420,553 | 1/1969 | Poxon et al. | 138/121 |
| 3,548,882 | 12/1970 | Rinker | 138/129 |
| 3,794,080 | 2/1974 | Huston et al. | 138/121 |
| 3,815,639 | 6/1974 | Westerbarkey | 138/135 |
| 3,857,415 | 12/1974 | Morin et al. | 138/122 |
| 3,860,041 | 1/1975 | Leiter | 138/144 |
| 3,976,578 | 8/1976 | Beane | 138/121 X |
| 4,073,317 | 2/1978 | Ellis | 138/147 |
| 4,214,612 | 7/1980 | de Putter | 138/129 X |
| 4,336,798 | 6/1982 | Beran | 138/122 |
| 4,514,245 | 4/1985 | Chabrier | 138/144 X |

FOREIGN PATENT DOCUMENTS

| | | |
|---|---|---|
| 484059 | 4/1976 | Australia . |
| 2504544 | 8/1976 | Fed. Rep. of Germany . |
| 2008277 | 1/1977 | Fed. Rep. of Germany . |
| 2630455 | 1/1978 | Fed. Rep. of Germany . |
| 2645946 | 8/1982 | Fed. Rep. of Germany . |
| 2838990 | 4/1983 | Fed. Rep. of Germany . |
| 2540273 | 11/1983 | Fed. Rep. of Germany . |
| 2080303 | 11/1971 | France . |
| 2416414 | 8/1979 | France . |
| 1262962 | 2/1972 | United Kingdom . |
| 1528511 | 10/1978 | United Kingdom . |

Primary Examiner—Benjamin R. Fuller
Attorney, Agent, or Firm—Louis Bernat

[57] ABSTRACT

A tuned convoluted conduit assembly is especially well adapted for use in hostile environments subject to vibrations which bring on fatigue failures. To prevent the conduit from having a uniform resonance throughout its length, the convolutions have a variable wall thickness. One way this variable wall thickness may be achieved is by forming the conduit walls by wrapping tape in successive layers to form a multiple layered wall. The width of the tape may be such that each alternate convolution has more layers than its two adjacent neighboring convolutions. A sleeve or stocking loosely fits over the conduit and is clamped by a band onto the conduit to prevent vibration of the conduit at that clamped location.

39 Claims, 6 Drawing Sheets

AXIAL WRAP SWED

TUNED SELF-DAMPING CONVOLUTED CONDUIT

This is a continuation-in-part application of U.S. patent application Ser. No. 873,836, filed June 9, 1986, which in turn is a continuation-in-part application of U.S. application Ser. No. 828,279, filed Feb. 11, 1986, and entitled "Tuned Self-Damping Convoluted Conduit".

This invention relates to convoluted flexible pipes, hoses, ducts, conduits, and the like, suitable for use in hostile environments which impose a high fatigue responsive to shock, vibration and the like, and especially to tuned conduits which are self-damping.

The term "conduit" is generically used herein to refer to almost any kind of device for conducting a fluid, without regard to whether it might be more appropriate to call it a hose, pipe, tube, duct, or the like. The conduit problems outlined below may be illustrated by making a reference to an automotive exhaust system (such as the conduit between an engine exhaust manifold and a catalytic converter, for example). However, the invention is not limited thereto. For example, steam lines, hot air lines, and gaseous fuel lines have many similar problems. Therefore, this reference to automotive exhaust systems is not to be taken as necessarily limiting the invention thereto. Nor, is it limited exclusively to high temperatures or a gaseous media. Reference is made to U.S. Pat. No. 4,315,558 and references cited therein for a use of a convoluted conduit in an automobile exhaust system.

An automobile exhaust system is an example of a hostile environment in which the invention might be used. The exhaust is very hot and filled with corrosive gasses under pressure. There are substantial vibrations, both rhythmic (such as vibrations caused by the regular rotation and related harmonics of the engine) and random (such as might be caused by the vehicle striking flying rocks and chuck holes). If a small crack occurs in the conduit, the exhaust gas is forced out by the internal pressure and the resulting corrosion together with normal vibration and flexure cause a rapid deterioration of the system. Another consideration is cost. An automobile is sold in an extremely competitive market where a manufacturer's survival may be determined by a few pennies of extra cost, per part. The cost in time and labor for installation or replacement of exhaust system parts can be another and similar limiting factor. Yet another consideration is noise. An engine usually has to have a muffler, which is an expense, both in the economic sense of cost and in the energy sense because the muffler inherently robs the engine power by increasing the back pressure. If the exhaust tube is able to reduce the noise somewhat, the muffler may be made more simple, with less back pressure.

Accordingly, an object of this invention is to provide new and improved conduits. Here, an object is to reduce both vibration and noise with less loss of power, as a result of such reduction.

Another object of this invention is to provide conduits for use in hostile environments where there is a substantial amount of vibration. Still another object of the invention is to provide conduits for use in systems where there are many sources of vibration, such as conduits for use in automotive exhaust systems. Here, an object is to quiet the exhaust of an engine.

An object is to tune out resonance in the automotive spectrum from about 2000 to 6000 RPM. Resonance may be 100 hertz, at 6000 RPM speed. In addition, an object is to eliminate resonance for the tube at second, third, fourth, fifth harmonics, depending upon what the engine is doing.

In keeping with an aspect of the invention, these and other objects are accomplished by a convoluted conduit made from multi-ply coaxial layers of tubing or from a tape wrap, preferably using one or more long, ribbon-like, metal strips (such as stainless steel, carbon steel, brass, bronze, or various alloys), which are wound one over the other to make conduits with multi-layered walls. By selecting a proper configuration for the convolutions, the hose may be made more self-damping so that it resists vibration and thereby sharply reduces metal fatigue. An outer stocking or sleeve may be placed over the conduit and secured thereto in selected locations to further reduce vibration by resisting the formation of a standing wave along the length of the conduit responsive to the various vibrational sources of the associated mechanical system. Depending upon the services to which the conduit may be put, a number of further materials or processing steps may be added. For example, the interfaces between at least the edges of the tape and localized paths at one or more interfaces of tubes may be brazed or may otherwise be bonded by non-metallic high temperature elastomers such as polytetrafluoroethylene polymers, silicones, epoxies, or the like. Also, suitable gaskets, sealing, or bonding may be provided, often in random patterns, between adjacent layers to add damping characteristics and to seal against leaks, The inventive device may include a multi-ply innercore with a braid having various degrees of slack and at least one "tuning" ring that is used to increase the stiffness and therefore, to control the related natural frequency of the assembly.

When the clamping band is taken up tightly and the braid is in direct contact with the innercore, there is a fully integrated spring system which achieves a natural frequency (resonance) at substantially higher levels than is achieved by either the innercore or the braid, acting alone. However, when there is no clamp ring and the slack braid is anchored to the fittings along with the innercore, there is no contact between the spring and the innercore and each system achieves its own separate resonance frequency, as though the two systems were parallel springs, without contact between them. In this case, the way that the slack braid dampens the innercore is to physically contact it at random periods during vibration. This random contact produces substantial noise and extensive chafing at the interface of the braid and innercore structures. When bands clamp the slack braid at various points along the length of the conduit, they vary the lateral and axial spring rates and thus the related resonance frequencies. Each length of the conduit can be customized for various system conditions of vibration resonance and dampening.

Several embodiments of the invention for accomplishing these and other objects are shown in the attached drawings in which.

The invention relates to convoluted conduits made by wrapping tape around a form. For example, BX cable used to provide electrical wiring in home construction has an armor coating which is a convoluted conduit made by wrapping a metal strip or tape around a form. Certain aircraft fuel lines provide examples of a non-metallic convoluted conduit. This type of fuel line is made by wrapping strips of polytetrafluoroethylene ("Teflon"), layer on layer, and by wrapping a fiber glass tape on the outside of the resultant structure to form a tube or conduit. These and other conduits illustrate tape wrapped conduits similar to that contemplated by the invention.

This invention provides a flexible metal conduit assembly primarily for use with a high temperature transfer of fluids, such as the conduits used in engine exhaust systems, in steam lines, or in hot air lines that are subject to extreme vibration or flexure. In these and similar installations, there is a substantial movement between the ends of the assembly at both very low and very high frequencies, as a result of mechanical vibrations and of the related resonances, as well as from movements due to thermal expansion and contraction which occur during normal operational displacements of parts. For example, the conduit connecting the engine exhaust manifold to the catalytic converter of an automobile may be exposed to an extreme vibration and intermittently heavy resonance up to frequencies in the order of 500 hertz and sometimes more. There may be offset movements in the order of one inch displacements in three planes due to mechanical vibration and expansion caused by exhaust gas at temperatures that may reach 1500° F., and more. Normally, these conduits are very tightly positioned in locatons where relatively large hoses, which may be two or more inches in diameter, are restricted in lengths as short as seven or less inches. The fatigue problem is extreme and the restricted spaces demand novel solutions to provide the endurance and to enable the movements which are needed for long term service.

Very often the operating conditions or design requirements preclude the use of most plastics for making a conduit with sufficient flexure and endurance. For the types of applications described above, the conduit may be made from metallic convoluted tubing or tape which is wrapped to form convoluted tubing in a symmetrical and consistent form (FIG. 1) so that flexure stresses are spread uniformly throughout each convolution and over the entire length of conduit. The metal used to make the conduit is selected on a basis of chemical and thermal compatibility for the application. The thickness of the tube wall depends upon what is needed to resist the pressures anticipated during the intended service.

Figure 2A:
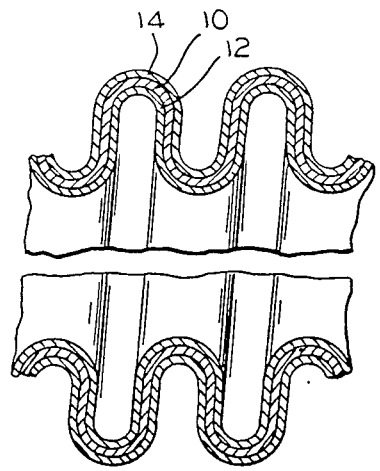
FIG. 2A is a similar cross-section of a conventional multi-wall conduit made from coaxial tubes.
Figure 2B:
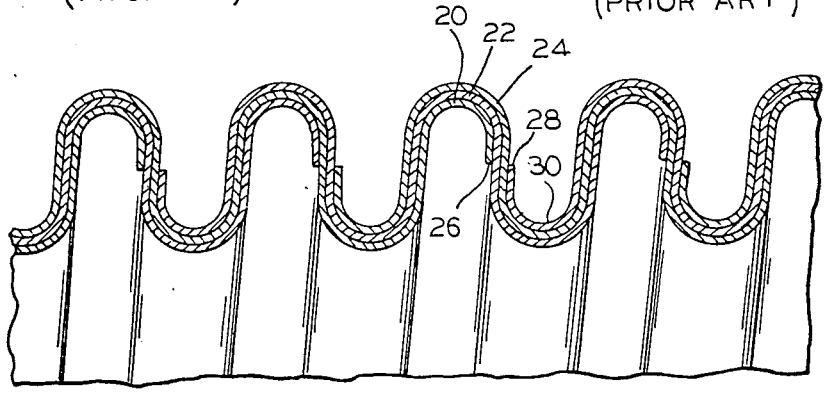
FIG. 2B is a similar cross-section of a conventional multi-wall tape wound conduit with symmetrical convolutions.

When the conduit must be more flexible than the convolutional geometry allows with a single wall thickness, multiple walls of thin, coaxial positioned tubes or metallic tape wound in multiple layers can be convoluted as shown in (FIG. 2) to reduce the force required to flex the conduit. FIG. 2A shows coaxial tubes and FIG. 2B shows multi-layers of tape. The unit stress on the metal is thus reduced so that the metal fatigue life is greatly improved. However, such a multi-layered conduit is more expensive than a single wall conduit.

When the anticipated service includes only a low level of vibration and cyclic flexure, the use of the multiple wall conduits together with a symmetric and consistent convolution form is a good solution for endurance against extreme fatigue. However, when severe and variable sinusoidal or random vibrations are also involved or when flexure is at very high frequency, the natural frequency, and the consequences of resonance must be considered. In this case, the assembly with the multiple wall has a lower spring rate and thus has an inherently lower natural frequency, with a higher amplification factor, as compared with a stiffer single wall conduit of the same wall thickness and convolution configuration.

Natural vibration frequencies often fall in the normal operating frequency of the equipment, e.g. the normal RPM of an engine causes sympathetic resonant vibrations in the conduit. This operating frequency may cause the conduit to experience resonance under normal operating conditions. Worse still, in these ranges, the natural vibration frequency of the conduit may match the resonant frequency of the engine. The resultant super-imposing of resonance on resonance creates an extreme, cyclic load amplification that leads to a fatigue failure in a relatively short time. Hence, prior art devices such as those shown in FIGS. 1 and 2 have required some kind of external damping to prevent or inhibit this kind of self-destructive resonance.

In both FIG. 2A and FIG. 2B, there is a conventional multi-layer tube having uniform wall thickness. In the case of FIG. 2A, three nesting tubes 10, 12, 14 are coaxially positioned inside each other, and then, all three are convoluted as a unit. In the case of FIG. 2B, three layers of tape 20, 22, 24 are wound over the other in an alignment which keeps edges 26, 28 of the tape layers opposite each other. Therefore, when the next layer 30 begins, it picks up where layer 20 left off to maintain a uniform thickness.

Figure 12:
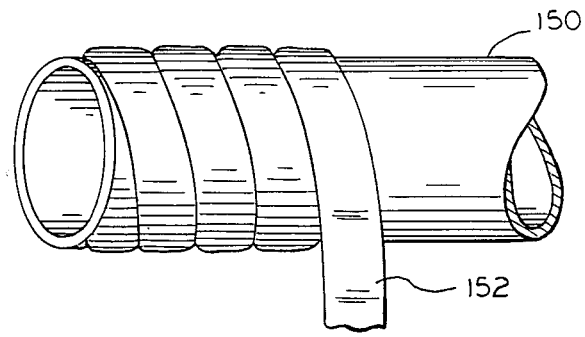
FIG. 12 is a perspective view which shows a seamless tube with a spiral tape, helically wrapped around it.
Figure 13:
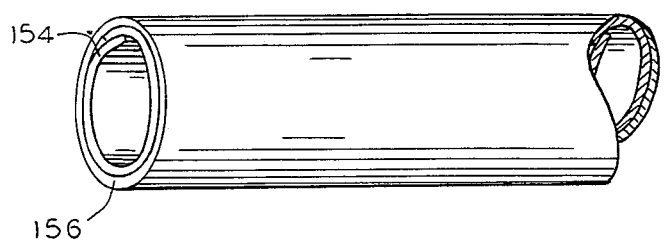
FIG. 13 is a perspective view which shows a seamless tube with an axially wrapped tape inside it.

Another way of making a tube is by wrapping a tape lengthwise. For example, a long ribbon which is eighteen inches wide and two mill thick may be rolled into a tube which is two inches in diameter. The strip is rolled on itself to make a multi-walled tube. A brazing material such as nickel may be deposited or formed on the edges of the ribbon so that the formed tube may be heated to braze the edges of the ribbon and complete the tube. In the alternative, that same eighteen inch wide ribbon may be rolled in a spiral and lapped to make the tube that way. After the multi-layered tube is completed with the edges inside and outside, possibly brazed, it may be convoluted. Still another way of making a tube (FIG. 12) is to begin with a piece of welded, thin wall tubing 150 and then to wrap tape 152 around it. The inner tube is completely tight and the wrap laminated structure may then be convoluted. A variation (FIG. 13) of this approach is to use a single ribbon 154, wrap it up lengthwise and make a single or multi-wall tube out of it and then insert this into a thin wall welded tube 156, all of which are convoluted. Also, that wrapped ribbon can be covered with an outer spiral wrap 158 and then convoluted. By making five layers of an inside tube, there is a certain amount of rigidity and a seal. Also, the tube is better able to take any internal pressure. The membrane forming the tube is placed under stress, which is additive to each layer. The tube without axial restraint can hold a certain amount of pressure (such as 15 to 100 psi) without causing a total deformation. With axial restraint, pressure can be increased ten-fold and more.

Figure 16:
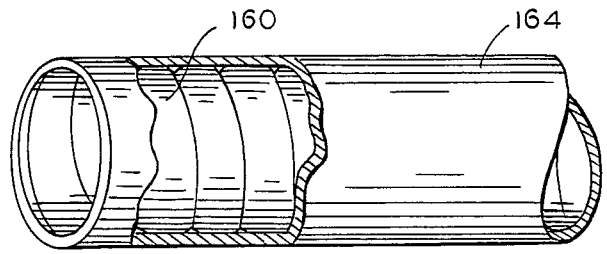
FIG. 16 is a perspective view, partially broken away, to show an internal spiral tape, helically wrapped tube therein.
Figure 17:
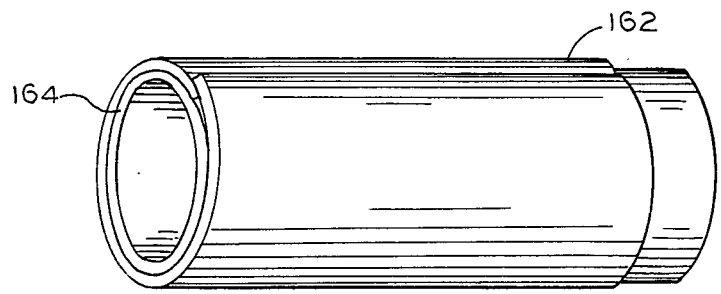
FIG. 17 is a perspective view which shows a seamless tube surrounded by an axially wrapped tape.

The innercore (FIGS. 16, 17) is formed by a thin strip which is wrapped (helical 160 or axial 162) with or without an internal or external welded thin wall tube 164. The decision of whether to use a helical or axial, with or without convolutions, form of wrap is one of economics and available tube forming equipment. Both forms of wrap are acceptable, but the axial form gives a more consistent surface finish (no wrinkling) because the strip does not have to be stretched unevenly, as it is stretched with the helical wrap. The decision of whether to use thin wall welded tubes, internally or externally of a wrapped tube, or both, is dependent upon the need for a bubble tight integrity, the viscosity of the fluid media, the system pressure and temperature, and the level of reliability that is needed. For the usual automobile exhaust systems, a bubble tight construction is not needed. However, for an aircraft fuel system with flexible couplings, both a bubble tight and a highly reliable hose is needed. Usually, an extremely flexible and fatigue resistant hose is needed, along with the respective levels of sealing and reliability.

Figure 1:
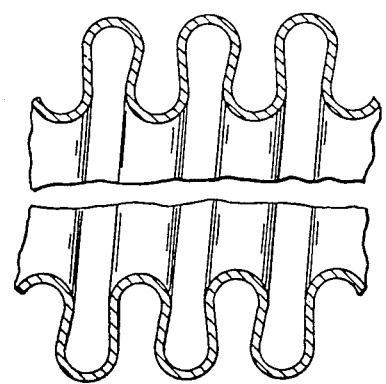
FIG. 1 is a partial cross-section of a conventional, non-self-damping symmetrical convoluted conduit made from a single wall of tape wound with a uniform annular or helical pitch.

In greater detail, all conduits, including those shown in FIGS. 1 and 2, have within themselves some inherent self-damping capabilities. However, conduits shown in FIGS. 3-6 that use non-symmetrical convolutions with a varying convolutional form, height, spacing, plies, and wall thickness along the length of the conduit have much higher levels of self-damping. The convolution height, H, h, or the convolution thickness T, t, or the convolution spacing, S, s, or any combination thereof, may be varied to significantly change the spring rate and the related natural frequencies between convolutions, and along incremental segment lengths of the conduit. Therefore, while some convolutions are experiencing an induced resonance, their neighboring convolutions, which have a different natural resonance frequency, do not synchronize with the convolutions which are then in resonance. In fact, adjacent convolutions tend to dampen the vibration of the nearby neighboring convolutions, thus making the entire conduit more self-damping.

The variations in convolution form are easily visualized and can be accomplished with machinery that convolutes multi-ply tubing or wraps one or more tapes at a time to form a multiple wall conduit. The spring rate can be changed substantially more than 10%, by using the techniques illustrated in FIGS. 3 thru 6. The larger variations in spring rate between convolutions becomes necessary when the conduit is subjected to external loads or high operating pressures. These external forces raise the spring rate and resonant frequency of the conduit, and reduce the effect of the original "free state" spring rate variation which in turn, reduces the self-damping of the conduit. On the other hand, as the spring rate changes more and more between convolutions, the distribution of strain between adjacent convolutions becomes more disproportionate. Then, the conduit's ability to flex becomes impaired because most of the flexing occurs in those convolutions which have the lowest spring rate. Therefore, care must be taken so that the non-symmetry of convolutions is great enough to assure self-damping under anticipated operating conditions, but also, is small enough to maintain the greatest possible uniformity of flexing.

When the convolutional form and variable plies (FIGS. 3, 4, and 5) alters the spring rate between convolutions, a use of concentric tubes to achieve multiple layers is practical, although it may be relatively expensive.

Figure 3:
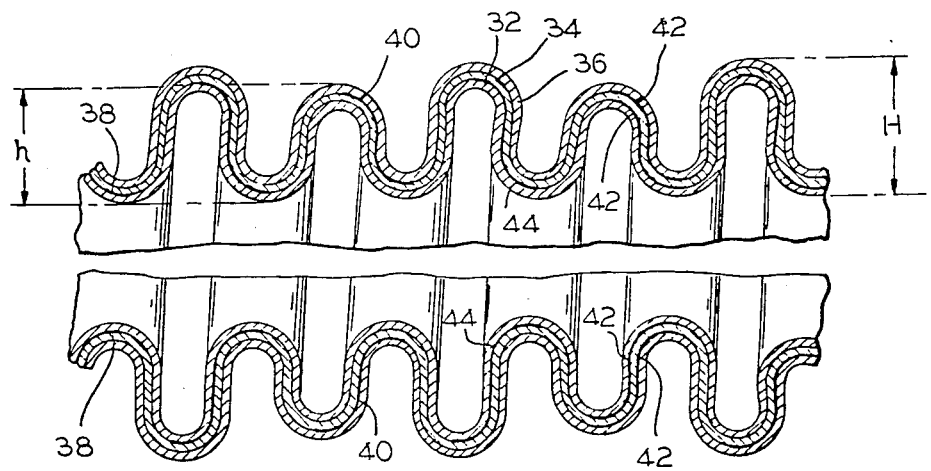
FIG. 3 is a similar cross-section showing the inventive self-damping, non-symmetrical, convoluted conduit made from multiple wall tubes or tape wound tubes with variable plies or variable height for the various convolutions, with layers bonded together in a random pattern to vary the wall thickness.
Figure 4:
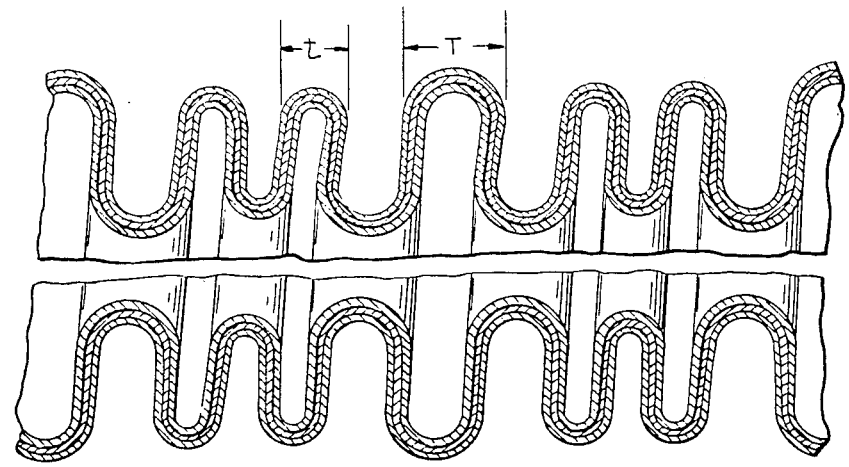
FIG. 4 is a similar cross-section of a conduit with annular or helical convolutions having variable plies, variable pitch and a variable height.
Figure 5:
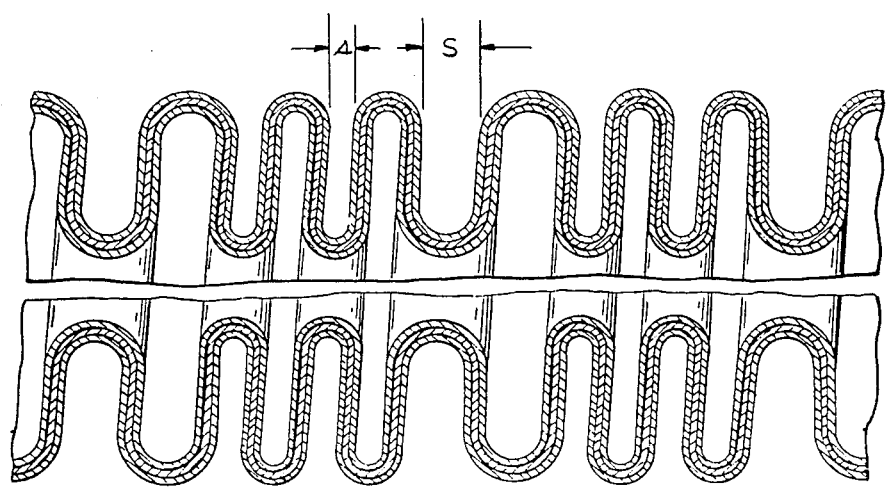
FIG. 5 is a similar cross-section with yet another form using variable plies and variable annular or helical spacing or pitch with uniform height.

FIG. 3 shows a tube which might be manufactured from either coaxially nesting tubes or multi-ply wound layers 32, 34, 36. At the interfaces between the several layers, there is a bonding in random patterns. For example, FIG. 3 has been drawn with a bonding (such as brazing) at the interface between the inner two layers, as shown at 38, 38. The brazing is shown between the outer two layers at 40, 40, and between both layers at 42, 42. The brazing at 40 is on the sloping side walls of the convolution. The brazing at 38, 38 is symmetrical at the crest of a hill or the root of a dale forming the convolution. The brazing at 44 is asymmetrical relative to the geometry of a convolution. These showings indicate that brazing may be used in random patterns to restrict uniformity of resonance in adjacent convolutions. The effect of the brazing is to make walls of variable thickness.

Another economical way to achieve a variation in spring rate between convolutions is to use a wrapped multi-layer structure (FIG. 6) with the wrapping tape overlapping itself in a non-uniform manner. The tape may be either helically or longitudinally (axially) wound upon itself. The overlapping edges of the helically wound tape can be made to end on a convolution in a manner that gives a variation in the thickness of layers and, therefore, a variation in the spring rate between convolutions. The strip edges of the longitudinally or axially wound tape may be given any suitable overlap to vary the width and radial thickness of a longitudinal strip extending along the length of the conduit.

Figure 6A:
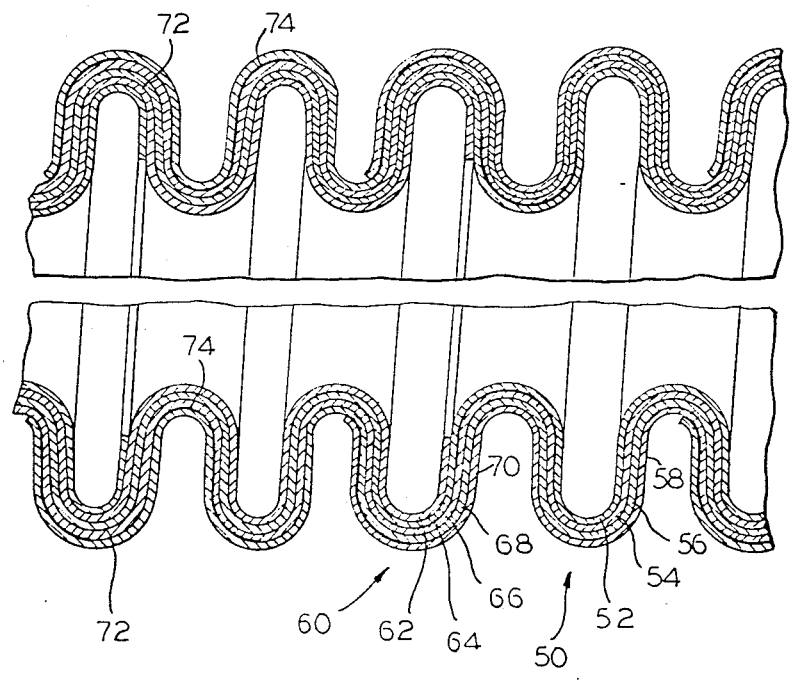
FIG. 6A is a similar cross-section showing a multi-wall wrapped conduit having variable plies and variable wall thickness, the interfaces between separate layers including, by way of example, several forms of metallic and non-metallic gaskets, sealing or bonding between adjacent layers forming the conduit.

More particularly, FIG. 6A shows a design where every other convolution of a helically wound conduit has either 4-layers or 5-layers at the root of the convoluted form. For example, at 50, there are four layers 52–58 of tape forming the wall of the conduit and, at 60, there are five layers 62–70 forming the wall of the conduit. By an inspection of FIG. 6A, it should be apparent that each successive convolution has a different number of layers, thereby giving each convolution a thickness which varies as compared to the thicknesses of its neighboring convolutions. However, alternative arrangements may be used. For example, sometimes one-third of the convolutions may be thicker or thinner than the remaining two-thirds of the convolutions. There may also be a variation in the form between adjacent convolutions to further refine the spring rate and the related natural frequency, as taught by combinations of the principles shown in FIGS. 3–6. Further, changes of form may be achieved by applying disposable layers of filler material of varying thicknesses to the inside surface of the conduit. When this disposable material of variable thickness is removed after the conduit is formed, there is a variation in the form of the conduit.

Figure 6B:
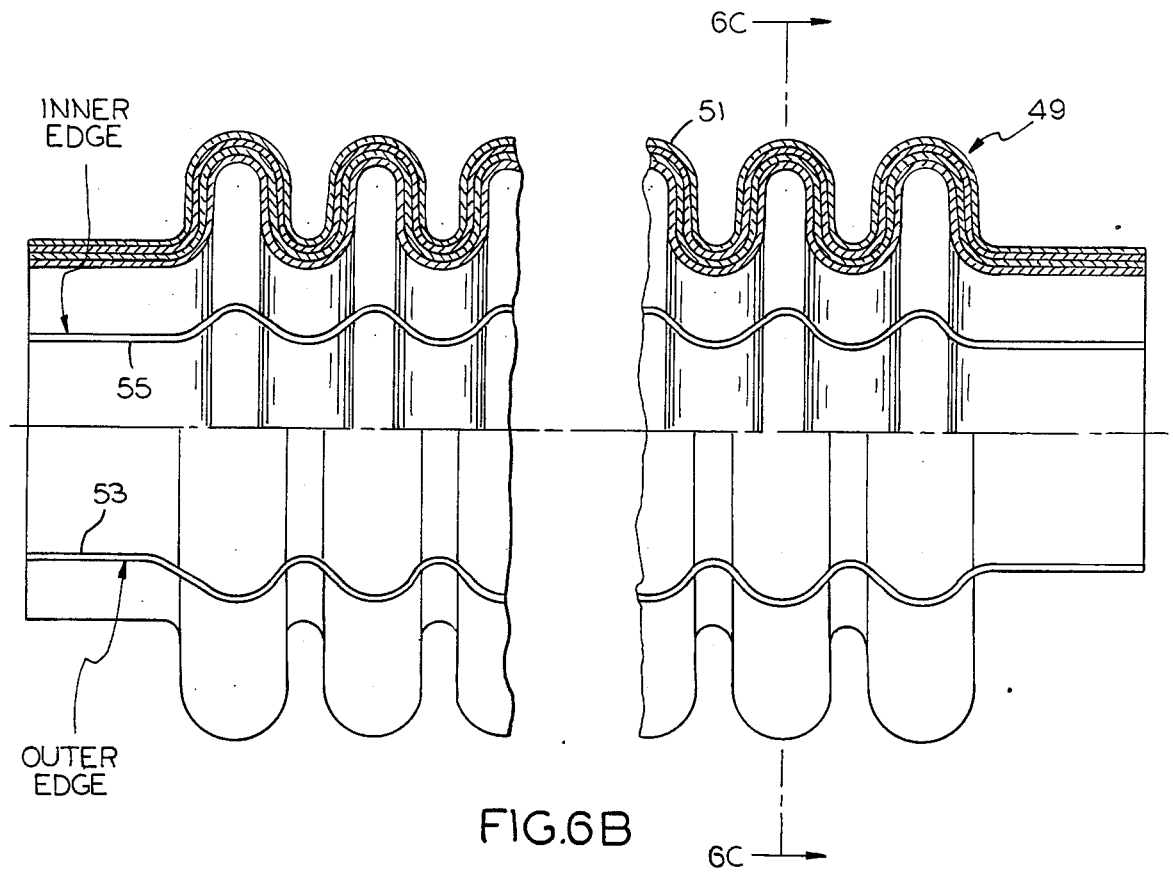
FIG. 6B is a side elevation, partially in cross section, of a conduit made of longitudinally or axially wound tape.
Figure 6C:
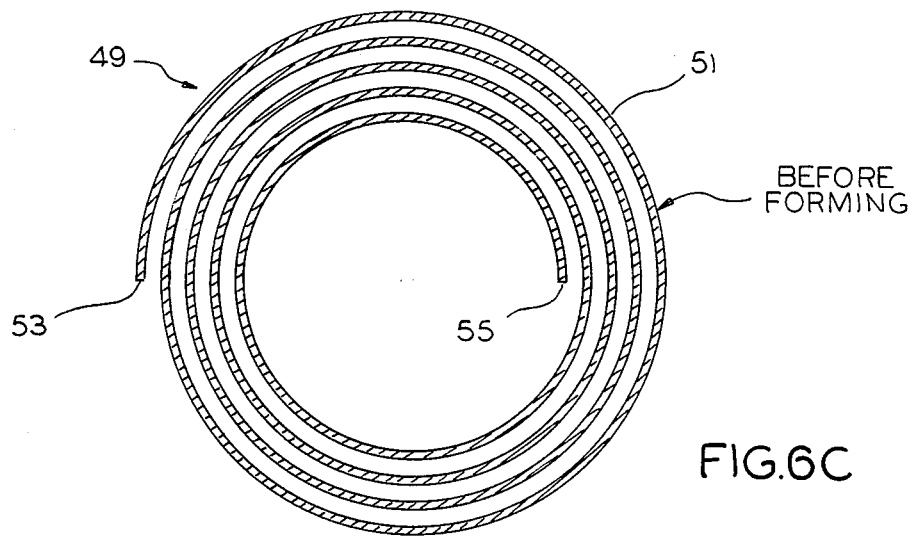
FIG. 6C is a cross section of the longitudinally or axially wound conduit taken along line 6C—6C of FIG. 6B.

FIGS. 6B and 6C illustrate a conduit 49 made from a longitudinally or axially wound tape, wherein an initially flat ribbon 51 having edges 53, 55 is wound upon itself to make the conduit. In the embodiment of FIG. 6C the outer edge 53 is displaced 180° from the inner edge 55. This means that the upper half (as viewed in FIG. 6C) of the conduit 49 has five layers while the lower half has four layers. Accordingly, the upper half is a longitudinal strip which extends along the length of the conduit and which is stiffer than the lower half.

The same principles enable the outer edge 53 to be displaced from the inner edge 55 by any convenient angular distance in the range of 0°–180°, thus giving the stiffer section any suitable width. Each convolution in this axially wound conduit may be the same as its neighboring convolutions, but the radial variations provide self-damping. The result is that any of many different tuning adjustments may be made. It is also noted that, by changing the length of the conduit, a different natural frequency may be selected.

The longitudinally or axially wrapped embodiment of FIGS. 6B, 6C has several advantages over other forms of wraps. First, the longitudinal wrap is smoother and, therefore, more wrinkle-free than the helical wrap. Second, the two edges 53, 55 have the same length which eliminates some problems and simplifies the design as compared with the helical wrap where one edge is longer than the other.

The multi-layered conduit of FIGS. 6A–6B may be made into a sealed, bubble-proof conduit so that there is no passageway for enabling an escape of fluid from the conduit. One way of sealing the multi-layers of the tape is to provide a layer of gasket material on either the inside or the outside of the conduit by laying down a strip of the gasket material as either the first or the last wrap. The gasket material may be either metallic or non-metallic. The appropriateness of this approach depends in part upon the characteristics of the fluid inside the conduit, upon its corrosive effects and impact, and upon how thin the various tapes may be. With these considerations in mind, the tape thickness is selected to avoid creating mechanical problems.

Another approach for sealing the conduit is to provide a relatively soft solder which may be applied in a liquid phase as a wash to coat the inside of the conduit.

Still another way of sealing the conduit is to provide a brazing material between the layers of the multi-layer wrap, as by plating a surface of the primary metal (e.g. stainless steel) tape with a brazing material such as copper. Yet another way is to apply successive wraps of steel tape and copper tape, for example, in alternate layers. The brazing material may cover either the entire surface of the tape or part of the surface of the tape, such as at just the edges of the tape which make the wall of the conduit. The resulting conduit is then placed in a brazing furnace which melts the brazing material and bonds the confronting surfaces of the steel tape, thereby making a unitary conduit wall. When the interface is only partly bonded by brazing, the brazed versus non-brazed area create a variation in plies which cause a substantial change in the stiffness and spring rate between convolutions of the conduit.

A string 72 or a tape 74 of gasket or packing material may be interposed between adjacent layers of the metal tape. Since the metal tape is tightly wound into the conduit form, the packing material is compressed between the layers of the tape.

The invention provides a means for tuning the assemblies to avoid resonance at anticipated vibration inputs and to maintain a quiet system. The design formula for resonance is:

$$N_F = K\sqrt{\frac{S_R}{M}}$$

where:
$N_F$ = Natural Frequency
$S_R$ = Stiffness (spring rate under installed conditions)
$M$ = Mass
$K$ = a constant that depends on the convoluted innercore construction, the degree of braid slackness, and the number and position of the tuning rings. The K constant is established empirically for each variation in design.

The concept is to make non-symmetrical convolutions that will be self-damping as a result of its unique design. A continuous, helically or axially-wrapped tape is formed with or without metallic or non-metallic tape interlayers to help seal the multi-ply, non-uniform convoluted wall thickness that is self-damping. In many cases, the FIG. 6 method of varying the wall thickness is substantially less expensive than non-symmetrical convoluted multi-ply conduit. In any of its many forms, a principal advantage of the multi-ply conduit is that it may be made with bubble tight seams, even at very high internal pressures.

For exhaust systems which operate at low pressures, when either tape-formed or tube-formed multi-ply non-symmetrical convoluted metal hose do not have to be bubble tight, the use of the non-symmetrical, wrapped form is preferred. In each case, adjacent convolutions are self-damping under resonance conditions. The choice of design depends upon the operating conditions and upon the economics for the application.

Concentric multi-ply tubes with brazing tape wrapped between tube interfaces create a variable ply geometry between convolutions. Wherever the surface between two tubes is brazed, the structure behaves as though the two bonded plies are, in fact, one wall thickness. Thus, bonding changes the thickness considerably.

One solution to the problem of a severe combination of vibration and flexure is to provide both multiple walls for flex endurance and a damping mechanism to reduce the amplitude and duration of the resonance vibrations. The damping might be provided by an external means which is used on or in connection with the conduit. However, the high operating temperature precludes the use of elastomers and the like on most exhaust systems for an internal combustion engine.

In greater detail, a conduit tends to vibrate as a taut string vibrates, with nodes and loops forming a standing wave. The loops may vary in length, depending upon the frequency of the vibration. An engine or related device tends to produce vibrations at a fixed frequency or in a frequency band, depending upon its operations. Therefore, if the conduit is forced to form itself into nodes and loops at locations and lengths which do not coincide with the nodes and loops of the fixed frequency or frequency band of vibrations produced by the associated device, the conduit may be tuned to vibrate at some other frequency which is not likely to occur in the system. With such tuning, the conduit becomes much less likely to vibrate at the frequencies which actually do occur.

The foregoing description has set forth various techniques by which the incremental lengths of the conduit may be given different vibrational characteristics, to preclude an overall conduit resonance. These same techniques may be used to tune the conduit. For example, the conduit may be stiffened in the areas where the conduit would naturally want to form a loop, at the pertinent and characteristic frequency of the engine. The areas where the condutt would naturally want to form nodes at these characteristic frequencies may be made relatively more flexible. Thus, it becomes more difficult for the conduit to develop a standing wave if the conduit inherently opposes the characteristics of that standing wave. The lengths of the stiffened and flexible areas may be selected to coincide with a frequency which is not likely to be produced by the device (engine) connected to the conduit. Thus, the conduit may be tuned out of the vibrating range of the system.

Figure 7:
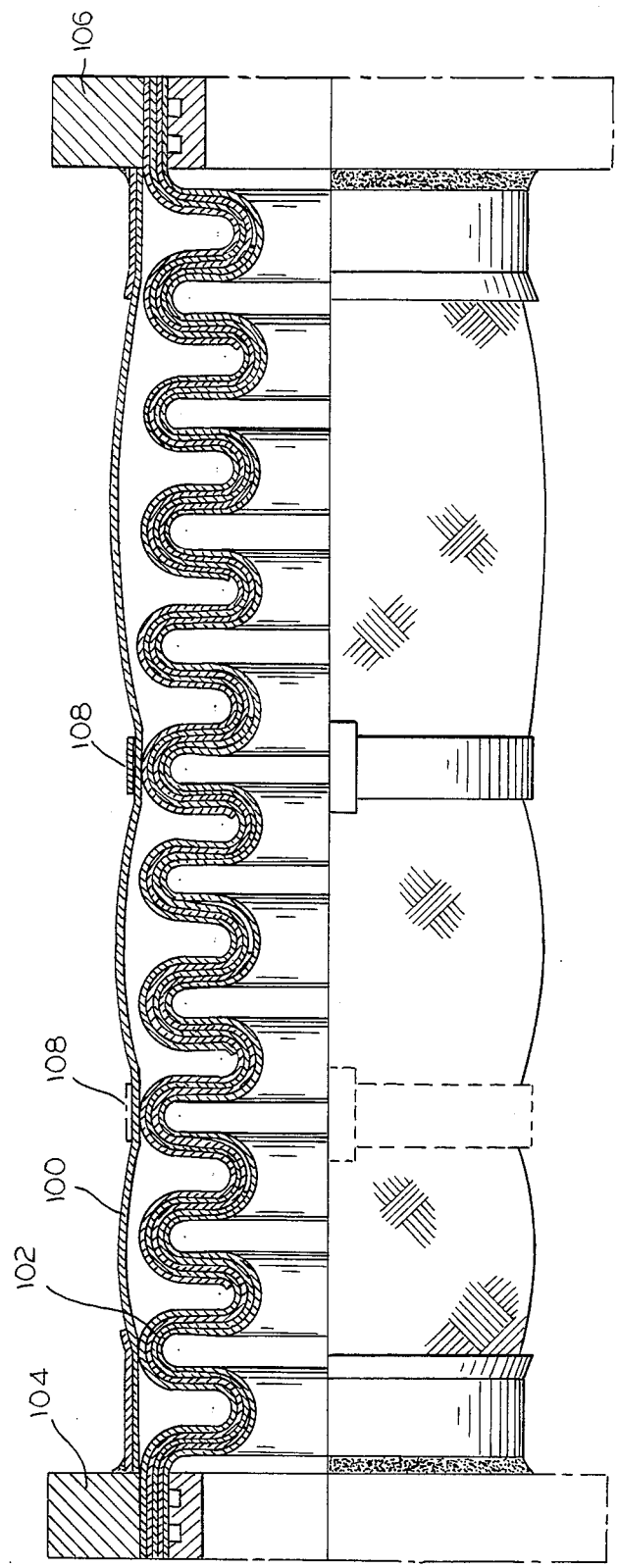
FIG. 7 is a side elevation, partially in cross-section showing a stocking or sleeve and a damping band for attaching the stocking or sleeve to the conduit at a selected location or locations.

This principle may be carried further by providing an outer braid sleeve or stocking 100 (FIG. 7) loosely covering and extending along the length of a conduit 102. If the bias angle of the braid is changed or if the diameter of the braid wire is changed, the flexibility and vibrational characteristic of the sleeve or stocking is also changed.

The braid serves three purposes. First, it adds pressure carrying capability to the innercore. When this capability is the primary need, the braid is normally snug fit over the innercore, with little or no slack. Second, the braid provides an armor protection for the innercore, to guard it from abrasion or impact. Third, by varying the braid pattern and the degree of the braid slack on the hose, the stiffness and related resonant frequency of the assembly may be varied to some extent in order to dampen the resonance of the innercore by making a random contact between the innercore and the braid, which vibrates out of phase with the innercore and causes noise and chafes the innercore.

Both the braid sleeve or stocking 100 and conduit 102 are anchored at either end by a mechanical device 104, 106 of any suitable design (as by welding). The braid sleeve or stocking may, for example, be a stainless steel braid, or the like. It seems apparent that in such a conduit, nodes are likely to be formed at the ends 104, 106 of the conduit and that the length of conduit extending between these ends is likely to form one or more loops, depending upon the frequency of vibration. Therefore, to prevent a standing wave with such a loop, a band or tuning ring 108 may surround the sleeve or stocking 100 to attach it to the conduit.

These tuning rings are installed, as needed, over the braid to keep the braid and the innercore in contact so that the braid can dampen the innercore without noise and chafing caused by impact. The positioning of the rings varies the stiffness of the assembly so that the natural frequency and the related harmonics can avoid the peak vibration modes which might otherwise be generated by the system (i.e. the auto engine, the fuel pump, etc.). Also, the tuning rings can be used in conjunction with the braid and other structures to enable the assembly to be tuned with a minimum noise and a maximum life.

There are an infinite number of variations for using and applying the three elements of an innercore, braid, and tuning rings. The tubes may be tuned by changing the stiffness of the innercore alone. For some applications, a very stiff assembly with a very high natural frequency is suitable because flexibility requirements are very, very modest. For an exhaust system connection, an extremely high level of flexibility is required. This high level of flexibility may be achieved by an innercore which has a very low level stiffness, and which resonates at low frequencies with many harmonics that fall within the range of system vibration frequencies. The wire braid and tuning rings provide stiffness (increase natural frequency) to the assembly and dampen the innercore resonance that occurs while still allowing a substantial level of flexibility of design for the innercore, to achieve a maximum flex endurance with a minimum noise level.

If the length of the conduit is close to the length of a loop for a fundamental frequency of the engine vibrations, which is likely to occur, the band or tuning ring 108 is positioned in the middle of that length to give a maximum damping at the crest of the loop. However, if the length of the conduit is equal to a multiple of the length of such loops for the frequency which is likely to occur, a plurality of bands or tuning rings 108 may be used, one at the crest of each loop. Likewise, if the vibrations are such that the conduit would respond to a second or third harmonic, a plurality of bands or tuning rings may be provided, one at the crest of each of the loops in those harmonics.

If, as is preferred, the bands or tuning rings 108 are drawn tightly around the braid sleeve or stocking 100 and conduit 102, the damping occurs as a result of the clamp holding the conduit with brute force. However, if the bands or tuning rings 108 loosely hold the sleeve or stocking in place on the conduit, there is an attenuation resulting from the internal mechanical working of the system as the conduit slightly moves back and forth with the sleeve or stocking, the conduit randomly colliding with the sleeve or stocking on each movement.

In a preferred embodiment, the conduit corrugations are annular, although helical corrugations may also be used. The individual plies of the conduit wall are made of steel and may be in the order of 0.001 to 0.010 inches thick. The sleeve or stocking 100 may be a braid of steel wire having a wire diameter in the order of 0.008 to 0.032 inches. The braid is somewhat slack, except where it is secured by the bands 108. This slackness provides for expansion and contraction of the conduit. Antenuation also occurs as a result of the internal working of the metal which forms the sleeve or stocking.

The tuning bands may be made in a number of different ways (FIGS. 8-11), a primary consideration being whether the conduits are sold to original equipment manufacturers or on the replacement or after market. An original equipment manufacturer makes thousands of identical units and therefore, a need for stocking many different types of parts uniquely dedicated to a particular model is less important than the savings of a few cents per part. On the other hand, in the replacement or after market, a savings of a few cents per part is much less important than the cost of having to stock many different types of parts, some of which may never be used.

Figure 8:
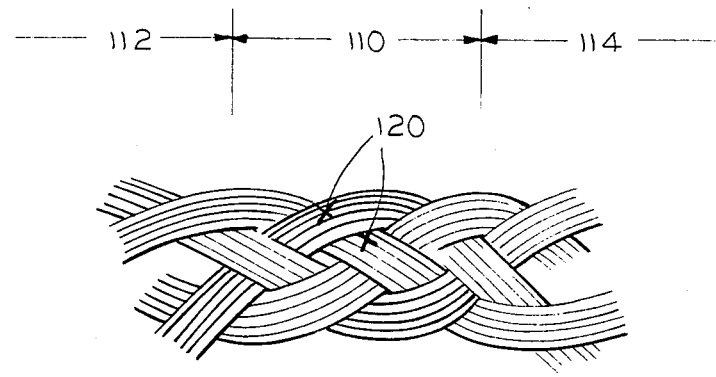
FIG. 8 is a fragmentary and schematical showing of a braid sleeve or stocking having relatively tightly packed wire to provide a tuning ring and relatively loosely packed wire in other areas of the stocking or sleeve.
Figure 9:
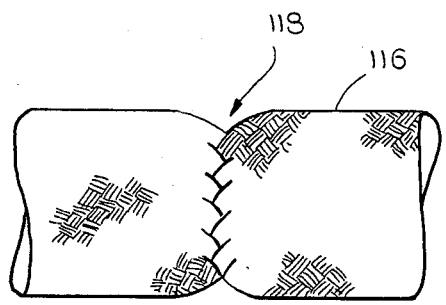
FIG. 9 shows how a tuning ring may be formed by twisting a braid sleeve or stocking.

For the original equipment market, the tuning rings may be built into the braid, itself (FIGS. 8, 9). Thus, for example, the pack of the braid (FIG. 8) may be varied so that it is very tightly woven in the area 110 where a tuning ring appears and loosely woven at 112, 114 which are outside of the tuning ring area. In another embodiment, the angle at which the braid is laid down may be changed to stiffen the areas of the tuning ring. Still another method of forming the braid 116 itself into tuning rings is to twist it (FIG. 9) about its longitudinal axis in the area 118 of the tuning ring. Still another method is to snag some wires of the braid to gather it in the area of the tuning rings. In any of these embodiments, further stiffness may be added by spot welding the braid (shown at "X" marks 120, by way of example) in the area of the tuning rings.

Figure 10:
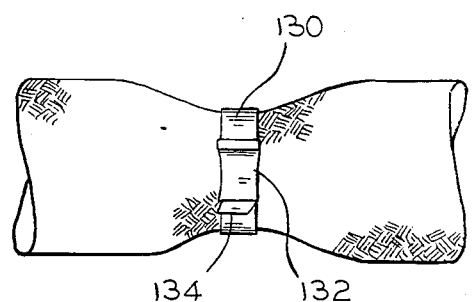
FIG. 10 shows a tuning ring which is attached over a braid by a special tensioning tool.

In the after market, the rings may simply be bands 130 which are wrapped around the braid and then drawn tightly. This may be done by wrapping and welding or by the use of special tools somewhat similar to the tools used to attach metal strapping around a shipping box. As shown in FIG. 10, the special tool has crimped a strap fastener 132 around the braid, after which the end of the strap is cut off at 134. Another approach is to provide tuning rings which may be tightened. For example, a radiator hose clamp type of tuning band may be tightened by the use of a screw driver or wrench.

Figure 11:
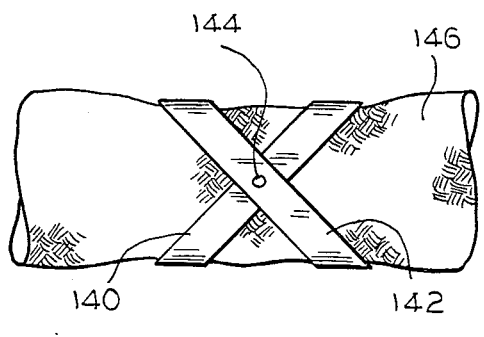
FIG. 11 shows a tuning ring which is attached over a braid by a self-tightening ring.

Still another type of self-tightening tuning ring comprises two generally oval bands 140, 142 (FIG. 11) nested in each other and joined by a pair of diametrically opposed pivot points, one of which is seen at 144. The oval shape gives the rings an inside diameter which is large enough to enable them to slide freely over the braid 146. When the rings are in place, they are spread apart, as shown in FIG. 11, to surround the braid 146 at an angle, which has oval cross-sections. This causes the rings 140, 142 to tighten upon and seize the braid 146 and innercore (not shown in FIG. 11). One aspect of this type of tuning ring is that there is a variable and controlled amount of stiffness moving from a relatively more flexible area at the outer edges of the rings to a relatively more stiff area at the cross over points 144 where the rings intersect.

The principles described above may be modified somewhat according to specific needs of any given system. The design variables are as follows:

1. Add metallic "band" along the length of the conduit with or without slack wire braid.
2. Add elastomeric "band", with or without slack wire braid.
3. Lengthening the lead (pitch) of the braid increases axial and lateral force, with or without slack wire braid.
4. Use heavier wires to make the braid increase in the overall stiffness, with or without slack wire braid.
5. Tighter braid (no slack wire) increases the stiffness of the conduit and inhibits the convolution movement.
6. Looser braid (slack wire) reduces the stiffness and enables the innercore to move freely in all planes without dampening, except when contact is made as when the braid and innercore vibrate randomly, relative to one another.
7. Use of an elastomer layer, full length outside braid, increases weight, cost and stiffness, and adds dampening to the dampening provided by the braid, in Items 1 through 6, above.
8. Use of elastomeric mold outside the convoluted innertube; however, inside, the braid can be used to inhibit or dampen the innercore axial and lateral motion, in Items 1 through 6, above.
9. External metal brackets can be added to inhibit axial motion and to restrict lateral motion for Items 1 through 8, above.
10. External or internal telescoping (dash pot) tubes can be added to inhibit and restrict both axial and lateral motion for Items 1 through 8, above.
11. Change wall thickness, convolution geometry or convolution count for the innercore in conjunction with any or none of Items 1 through 10, above.

By using these principles, the conduit may be tuned to have a resonance characteristic at any desired one of many possible frequencies.

The tuning of the system and the control over the vibration of the conduit also dampens the noise within the conduit which is generated by the device coupled thereto, such as an engine or compressor. Thus, the device runs quieter. The absence of muffler baffles within the conduit tends to reduce the amount of power loss which is normally experienced with other sound reduction systems.

Other configurations may be used in making a tunable resonant exhaust conduit system, such as by attaching or affixing logitudinal cords or straps at the terminal ends of the conduit system and by attaching the other end of the cords or straps to the nodal cross-member bands 108. By adjusting the bands 108 diameters and the tautness of the suspension cords or straps, the conduit system can be tuned accordingly.

Those skilled in the art will readily perceive how to modify the invention without departing from the scope or spirit thereof. Therefore, the appended claims are to be construed to cover all equivalent structures.

What is claimed:

1. A tuned conduit for use in an automotive exhaust system, said conduit being tuned to greatly reduce vibration therein at specific frequencies which occur during operation of an automotive vehicle having said exhaust system, said conduit comprising at least one coaxial layer forming a conduit wall for carrying said exhaust, a stocking made of a flexible material loosely surrounding and in contact with the conduit, said stocking extending along a length of the conduit, and at least one tuning band surrounding said stocking for securing it to said conduit at a selected location, said selected location being where a loop naturally forms as a result of vibrations in said system at said specific frequencies.

2. The tuned conduit of claim 1 wherein there are a plurality of coaxial layers which are formed by successive layers of tape, to form a conduit said tape having a width and provided at selected locations on said conduit, the width and locations of said tape being such that a different number of layers is formed at adjacent locations, whereby there is a variable thickness of the conduit wall, said tape being laid down in the walls of said conduit so that naturally occurring nodes are made more flexible and naturally occurring loops are made stiffer.

3. The tuned conduit of claim 1 wherein said conduit has a length which is likely to form two loops, and there are two of said bands, one at each of said two loops.

4. The tuned conduit of claim 1 wherein said band tightly clamps said stocking to said conduit at a point where a loop naturally forms as a result of vibrations in said system.

5. The tuned conduit of claim 1 wherein said conduit has a length which is likely to form a plurality of said loops, and a plurality of said bands, each band being positioned to tightly clamp said stocking to said conduit at a point where one of said loops is likely to form.

6. The tuned conduit of claim 1 wherein said band loosely clamps said stocking to said conduit at a point where a loop naturally forms as a result of vibrations in said system.

7. The tuned conduit of claim 1 wherein said conduit has a length which is likely to form a plurality of said loops, and a plurality of said bands, each band being positioned to loosely clamp said stocking to said conduit at a point where one of said loops is likely to form.

8. An elongated tuned conduit having a length and having successive convolutions, said conduit having a mass and spring rate distributed along said length, said conduit being part of an automotive vehicle exhaust system and being exposed to an environment of vibrations when said vehicle operates, which environmental vibrations may set the conduit into sympathetic vibrations if no correction is provided to prevent said sympathetic vibration, said conduit naturally developing at least one loop responsive to said sympathetic vibrations if not prevented from doing so, tuning means comprising a stocking loosely surrounding said conduit for changing the mass and spring rate of said conduit, and tuning band means for clamping said stocking to said conduit in at least one location where said loop would otherwise form.

9. The elongated tuned conduit of claim 8 wherein said conduit is made of multi-layered tape, said multilayers being convoluted to unify said layers into a conduit wall, and said stocking is a metal braid.

10. The elongated tuned conduit of claim 8 wherein said conduit comprises a seamless cylindrical innertube having a tape wound at a bias angle around said innertube to increase a wall thickness of said innertube, said innertube and said tape being convoluted to form a unitary conduit wall.

11. The elongated tuned conduit of claim 8 wherein said conduit comprises a seamless innertube, an elongated ribbon wound axially and longitudinally on itself to form a cylindrical tube surrounding said seamless innertube, said innertube and said ribbon being convoluted for form a unitary conduit wall.

12. The elongated tuned conduit of claim 8 wherein said conduit comprises a combination of a seamless tube and a wrapped tape which are convoluted to unify the tube and tape to form a conduit wall.

13. The elongated tuned conduit of claim 8 wherein said conduit comprises an elongated ribbon wound longitudinally upon itself to build up a wall having a plurality of plies, said ribbon being convoluted to form a unitary conduit wall.

14. The elongated tuned conduit of claim 13 wherein said wound ribbon is placed inside a thin walled tube.

15. A tuned conduit extending between two anchor points at opposite ends of said conduit, said conduit being exposed to automotive caused vibrations, said conduit having at least one layer, a stocking made of a flexible metallic wire material surrounding said conduit and extending between said two anchor points, said stocking also being exposed to said automotive caused vibrations, and at least one tuning band surrounding said stocking for modifying said conduit response to the automotive caused vibrations of said conduit and stocking, the location of said band relative to said two anchor points being selected to provide different resonant characteristics in different areas of said conduit, said resonant characteristics opposing said vibrations to provide self-damping within said conduit.

16. The tuned conduit of claim 15 wherein said conduit comprises a plurality of coaxial layers formed by wrapping successive layers of tape to form a conduit wall, said tape having a width and provided at selected locations on said conduit, said coaxial layers being convoluted to form a unitary conduit wall, the width and locations of said tape being such that layers overlap in at least some locations so that a number of layers are formed in at least said some locations which is different from the number of layers formed in other locations, whereby there is a variable thickness of the conduit wall, said tape being wrapped to form the walls of said conduit so that at the frequencies of the automotive caused vibrations naturally occurring nodes are made more flexible and naturally occurring loops are made stiffer in order to make the conduit self-damping with respect to said vibrations.

17. The tuned conduit of claim 16 wherein said band is positioned at a location where a loop naturally forms as a result of automotive caused vibrations.

18. The tuned conduit of claim 15 wherein said conduit has a length which is likely to form two loops, and there are two of said bands, one at each of said two loops.

19. The tuned conduit of claim 15 wherein said band tightly clamps said stocking to said conduit at a point where a loop naturally forms as a result of vibrations in said system.

20. A tuned conduit having a length and comprising at least one layer forming a conduit wall; a stocking made of a flexible material loosely surrounding, in contact with, and extending along the length of said conduit; the flexible material of said stocking being integrally formed to provide at least one unitary tuning ring located at a loop in a naturally occurring vibration pattern of said conduit, said tuning ring having an internal diameter which secures said stocking to said conduit.

21. The tuned conduit of claim 20 wherein said conduit has a length which is likely to form two loops, and there are two of said tuning rings, one at each of said two loops.

22. The tuned conduit of claim 20 wherein said conduit has a length which is likely to form a plurality of said loops, and a plurality of said tuning rings, each tuning ring being positioned to tightly clamp said stocking to said conduit at a point where one of said loops is likely to form.

23. The tuned conduit of claim 20 wherein said conduit has a length which is likely to form a plurality of said loops, and a plurality of said tuning rings, each tuning ring being positioned to loosely clamp said stocking to said conduit at a point where one of said loops is likely to form.

24. A tuned conduit having successive convolutions for carrying fluids, a stocking made of flexible metallic material loosely surrounding said conduit and being in direct contact with the conduit, said conduit being exposed to an environment having vibrations, said flexible metallic material being formed so that said stocking itself is integrally formed to provide at least one unitary tuning ring in at least one location where the conduit might otherwise form a loop in response to said environmental vibrations.

25. A tuned convoluted conduit for use in an automotive vehicle exhaust system, said vehicle having a characteristic vibrational pattern, said conduit comprising a ribbon of tape which is axially and longitudinally wound upon itself to form a tube, said tape having opposing longitudinal edges angularly positioned relative to each other in order to provide a stiffened strip of selected width extending along a length of the conduit, said angular position being taken relative to an axis of said tube, said conduit being convoluted in a manner which cooperates with said stiffened strip to detune said conduit at said vibration pattern.

26. The conduit of claim 25 wherein the opposing edges are radially separated from each other by 180° whereby said stiffened strip has a semi-cylindrical size.

27. The conduit of claim 25 wherein the opposing edges are substantially aligned with each other whereby said stiffened strip has a minimum width.

28. The conduit of claim 25 wherein the opposing edges are offset from each other by a radial angle in the range of 0°–180°.

29. The conduit of claim 25 and a stocking made of a flexible material surrounding and extending along the length of said conduit.

30. The conduit of claim 29 and at least one tuning ring surrounding said stocking means for modifying the vibrational characteristics of said conduit.

31. The tuned conduit of claim 25 wherein convolutions are symmetrical between themselves and along the length of said conduit but are radially unsymmetrical owing to an added layer of said tape within said stiffened strip between said angularly positioned longitudinal edges of said tape.

32. A conduit for use in an exhaust system for an internal combustion engine, said exhaust system experiencing a pattern of vibrational frequencies, said conduit having a length and being formed by multiple layers of tape wrapped upon themselves, said conduit further being convoluted to form a unitary conduit wall with individual convolutions having a variable geometry relative to other convolutions, said conduit wall having a mass and a spring rate distributed along the length thereof, said variable geometries being distributed along said conduit in a manner which detunes said conduit in at least one frequency of said vibrational pattern, and a stocking made of braided metallic wire material surrounding said conduit and producing a vibrational response characteristic which cooperates with said convoluted geometry to further detune said conduit in at least said one frequency, said convolutions and the braid characteristics cooperating to control and vary the mass and the spring rate of the conduit to change its natural vibrational response.

33. The conduit of claim 32 wherein said conduit is formed by helically wrapped layers of tape.

34. The conduit of claim 32 wherein said conduit is formed by axially wrapped layers of tape.

35. The conduit of claim 32 wherein said conduit is formed by a combination of helically wrapped layers of tape and axially wrapped layers of tape.

36. The conduit of claim 32 wherein said stocking is tightly fitted around said conduit.

37. The conduit of claim 32 wherein said stocking is loosely fitted around said conduit.

38. An elongated conduit for use in an automotive exhaust system, said conduit having a length with a mass and a spring rate distributed along the length thereof, said conduit being formed by a plurality of layers of tape wound upon themselves and convoluted to form a unitary conduit wall with alternate peaks and valleys distributed along the length of said conduit, the configuration of said peaks and valleys being selected to vary the mass and spring rate of said conduit in a manner which detunes vibrational resonance of said conduit at selected frequencies, a stocking made of metallic wire surrounding said conduit and producing vibrational responses relative to said conduit which further controls said resonance, mechanical anchoring means attached to said conduit and stocking at opposite ends thereof for joining them together, said anchoring means being adapted to attach said conduit and stocking into said exhaust system, and tuning rings surrounding said stocking for securing said stocking to said conduit at locations along the length of said conduit where loops might otherwise be formed by said detuned resonant vibrations.

39. A convoluted conduit comprising at least two co-axial layers of axially wrapped tape which have intimate contact between said layers forming a multilayer conduit, said conduit being convoluted after being wrapped in order to form a unified conduit wall, a stocking made of flexible metallic braid loosely surrounding said conduit, and said metallic braid stocking being integrally formed to provide at least one tuning ring located at a loop in a naturally occurring vibrational pattern of said conduit and said tuning ring securing said stocking to said conduit.

* * * * *

UNITED STATES PATENT AND TRADEMARK OFFICE
CERTIFICATE OF CORRECTION

PATENT NO. : 4,854,416

DATED : August 8, 1989

INVENTOR(S) : James M. Lalikos and Harold K. Waite

It is certified that error appears in the above-identified patent and that said Letters Patent is hereby corrected as shown below:

Col. 2, line 33, the comma (,) should be a period (.).

Col. 3, line 48, "sprial" should be --spiral--;

line 51, "wapped" should be --wrapped--;
"sprial" should be --spiral--.

Col. 4, line 23, "locatons" should be --locations--.

Figure 14:
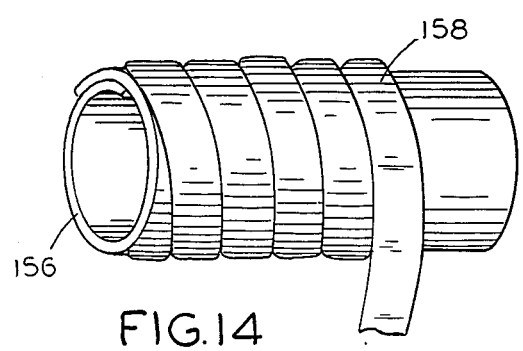
FIG. 14 is a perspective view of an axially wrapped ribbon or tape with a sprial tape, helically wrapped around it.
Figure 15:
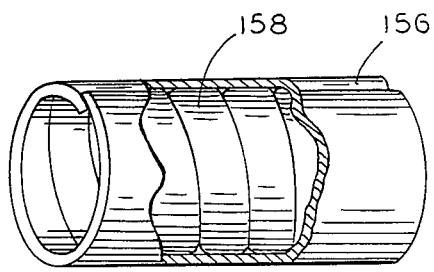
FIG. 15 is a perspective view partially broken away, to show an axially wapped tape tube outside a sprial tape, helically wrapped tube.

Col. 5, line 43, after "Also," and before "that" insert --in FIG. 14--;

line 44, after "ribbon" insert --156--.

Col. 9, line 47, "condutt" should read --conduit--.

Col. 11, line 14, "Antenuation" should read --Attenuation--.

Col. 13, line 11, after "tape" delete the comma (,);
after "conduit" insert --wall,--;

line 16, after "in the" change "walls" to --wall--.

UNITED STATES PATENT AND TRADEMARK OFFICE
CERTIFICATE OF CORRECTION

PATENT NO. : 4,854,416

DATED : August 8, 1989

INVENTOR(S) : James M. Lalikos and Harold K. Waite

It is certified that error appears in the above-identified patent and that said Letters Patent is hereby corrected as shown below:

Col. 16, line 30, after "length" change "with" to read --and--.

Signed and Sealed this

Twenty-second Day of January, 1991

*Attest:*

HARRY F. MANBECK, JR.

*Attesting Officer*  *Commissioner of Patents and Trademarks*